UNITED STATES PATENT OFFICE.

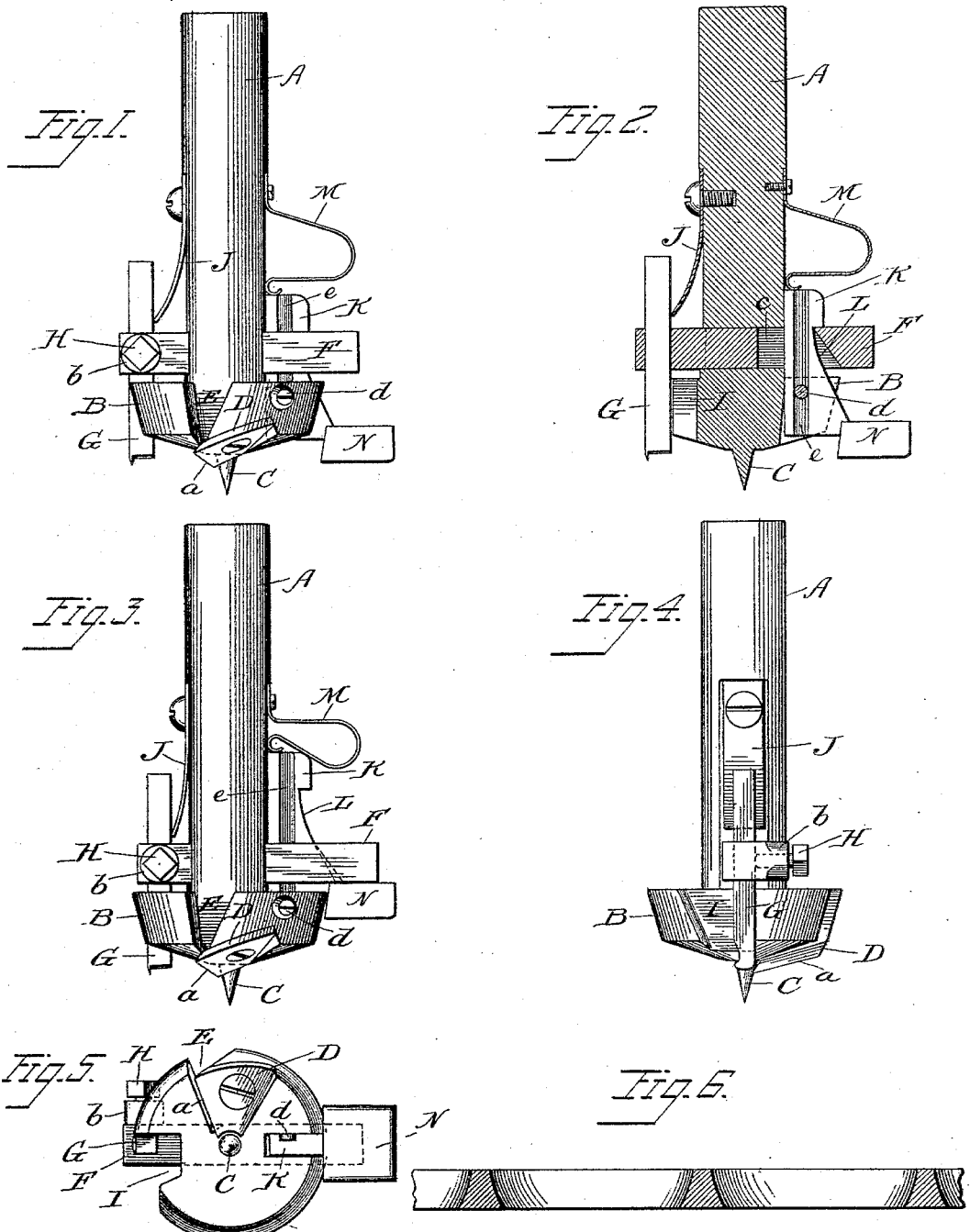

THOMAS S. FERGUSON, OF OMAHA, NEBRASKA, ASSIGNOR TO THE FERGUSON COMPANY, LIMITED, OF SAME PLACE.

ADJUSTABLE CUTTER-BIT.

SPECIFICATION forming part of Letters Patent No. 598,142, dated February 1, 1898.

Application filed July 2, 1897. Serial No. 643,308. (No model.)

*To all whom it may concern:*

Be it known that I, THOMAS S. FERGUSON, a citizen of the United States, residing at Omaha, in the county of Douglas, in the State of Nebraska, have invented a certain new and useful Boring-Tool, of which the following is a description, reference being had to the accompanying drawings, forming part of this specification.

My new boring-tool, or adjustable "cutter-bit," as it may be more specifically designated, is designed for the boring of holes or recesses of varying diameter from top to bottom. It is more especially designed for the boring of holes and recesses whose diameter decreases from top to bottom, either by a straight inward incline or in a curved line, particularly the latter.

The tool consists, essentially, of a suitable stock, an adjustable cutter movable toward and from the axis of the tool, and a shaper or pattern cam or surface coöperating with the adjustable cutter to determine its movement relatively to the axis of the tool and to thereby determine the shape of the hole formed by the cutter.

The specific purpose for which my new tool is designed is the boring of holes in egg-trays of a suitable shape to receive and snugly fit the eggs when placed in such trays, the diameter of such holes decreasing from top to bottom in a curved line conforming to the outline of the eggs, and it is this particular form of my new tool which has been illustrated in the accompanying drawings. It will be understood, however, from the description which will be given of my invention that its utility is not restricted either to this particular form of tool nor to tools designed for this or closely analogous purposes, but that by making such formal modifications as may be necessary to adapt the tool to the particular work desired to be done it may be employed for a great variety of purposes.

Having thus indicated the general nature of the invention, I will next proceed to describe it more in detail by an explanation of the one form of tool which has been illustrated in the accompanying drawings, in which—

Figure 1 is a front elevation of the tool; Fig. 2, a middle vertical section thereof; Fig. 3, a view corresponding to Fig. 1 with the adjustable cutter drawn inward toward the axis of the tool; Fig. 4, an elevation of the left side of the tool in Figs. 1 and 3; Fig. 5, a bottom plan view of the tool; and Fig. 6, a sectional detail of an egg-tray, showing the shape of the holes or egg-seatings formed therein by this tool.

The same letters of reference are used to indicate identical parts in all the figures.

The working parts of the tool are carried by a suitable stock A, which has formed upon its lower end a circular head B, having an inwardly-tapering periphery and provided at the center of its under side with a point C. Secured to the under side of the head B in a suitable recess formed to receive it is a cutter D, having a cutting edge $a$ inclined inwardly from the periphery of the under side of the head B to a point adjacent the point C, as seen in Fig. 5. Above the cutting edge of this cutter D the head B is provided with an opening E to permit the escape of the shavings formed by the cutter D.

Mounted to slide transversely through the stock A above the head B is a tool-holding bar F, provided in its left-hand end with a vertical opening in which fits the adjustable cutter G, consisting in the present instance of a vertical bar square in cross-section and having a cutting edge and lip formed upon its lower end. This cutter G is adjustable vertically in the holder F and is secured in its adjusted positions by a screw H, threaded through a boss $b$, formed upon the front side of the holder F and bearing at its inner end against the cutter G. The head B is provided with an opening or recess I to accommodate the cutter G and permit the escape of the shavings formed by it. A spring J, secured at its upper end to the side of the stock A and pressing outward at its lower end against the cutter G, forces the cutter and tool-holder F to the left and yieldingly holds them in the position shown in Figs. 1 and 2.

From the foregoing description it will be understood that when the tool is placed in boring position upon the surface of the material in which the hole is to be bored and pressed downward the point C will enter the material and serve to center the tool and that when the tool is rotated the cutters D and G will come into action to remove the material, the cutter G forming the outline of the hole and removing the material adjacent the outer edge thereof, while the cutter D will remove the material between the line of cut formed by the cutter G and the centering-point C. It will be seen that in normal position the cutting edge of the cutter G projects outward some distance beyond the outer end of the cutting edge $a$ of the cutter D, Fig. 5, and it will be understood that by gradually drawing the cutter G inward toward the axis of the tool its line of cut will be brought nearer and nearer such axis and the diameter of the hole being bored be thus gradually decreased as the boring progresses, until at the end of the operation the outer edge of the line of cut formed by the cutter G will be substantially coincident with the outer edge of the line of cut of the cutter D, Fig. 3, and the diameter of the hole formed be thus decreased from top to bottom to the extent of the inward movement of the cutter G.

The remaining element of the tool therefore consists in means for automatically moving the cutter G inward in the necessary manner during the progress of the boring to give the inner surface of the hole the desired shape, and this means consists of the shaper or pattern cam or surface, whose shape conforms to that which it is desired the inner surface of the hole shall have and which coöperates with the cutter G to automatically draw it inward against the resistance of the spring J as the boring progresses. This pattern cam or surface is in the present instance formed upon a vertically-sliding plate K, guided vertically against the right-hand side of the stock A in Figs. 1, 2, and 3, and passing through a vertical slot in the head B and through an opening $c$, formed in the tool-holder F. The plate K is further guided in its vertical movement by the end of a screw $d$, which is passed through a threaded hole in the head B, Figs. 1 and 3, and fits in a vertical groove $e$ in the plate K, Fig. 2.

The cam-surface or pattern-cam L is formed upon the right-hand edge of the plate K and coöperates with the extreme upper edge of the right-hand wall of the opening $c$ in the tool-holder F, through which opening the plate K passes, such wall of the opening being inclined to the right from its upper to its lower edge, as shown in Fig. 2. At the upper end of the pattern-surface L the plate K in the present instance is provided with an outwardly-projecting shoulder which normally fits against the upper surface of the tool-holder F and prevents the spring M, which bears against the upper end of the plate K, from forcing the latter entirely out of its position in the tool. At the outer extremity of its lower end the plate K is provided with a block or shoe N, which when the tool is in use rests and moves in a circle upon the surface of the work around the outer edge of the hole being bored. Under this construction and arrangement of the parts when the tool is placed in boring position upon the surface of the material in which the hole is to be bored and pressed downward the point C will enter the surface of the material, and the shoe N and the cutting end of the cutter G will come in contact with such surface at about the same time, so that as the boring progresses and the tool is forced downward the shoe N and plate K will be forced upward (relatively to the downward movement of the body of the tool) and the pattern-surface L, acting upon the tool-holder F, will gradually force the latter toward the right and draw the cutter G inward toward the axis of the tool. Now if the pattern-surface L consists of a straight surface inclined at any given angle to the vertical axis of the tool a hole will be formed whose wall will incline inward in a straight line at the same angle, while if the surface L is concave or convex a hole having a corresponding concave or convex wall will be formed. In the present instance the tool illustrated in the drawings is, as before stated, intended for forming holes or seatings in egg-trays, and the pattern cam or surface L is therefore made slightly concave, so that holes will be formed which will fit the outer surfaces of the eggs which are to be placed in them.

In Fig. 6 there is shown a sectional detail of a tray having such holes formed in it by the tool shown in the drawings.

Inasmuch as the cutter D is employed solely for the purpose of removing the material within the line of cut of the adjustable cutter G, it will be understood that by properly shaping the cutter G the head B and cutter D may be dispensed with in some cases and the cutter G be made to do the work of the cutter D, or the work of the cutter D may in some instances be left undone, as in forming holes in thin boards, where the cutter G may be caused to cut out a circular piece of the board and thereby form the hole.

Under the particular construction and arrangement illustrated in the drawings the tool is capable of boring only shallow holes or recesses and only holes whose diameters decrease from top to bottom either in straight lines or in curved lines, but it will be apparent that a skilful mechanic, by properly shaping and arranging the several parts of the tool for the purpose in view in each case, may fit it for boring holes whose walls will conform to any desired shape that may be given the pattern-cam. It will also be apparent that even where the tool is used for the specific purpose of the tool illustrated in the drawings or for strictly analogous purposes the details of construction and arrangement of the parts may be considerably varied without departing from the essential features of the tool. Thus, for instance, the action of the spring J and pattern-cam may be reversed, the spring being arranged to press the cutter G inward and the cam be employed to oppose and control its movement under the action of the spring, as will be readily understood.

Having thus fully described my invention, I claim—

1. A tool for boring holes or recesses of decreasing diameter from top to bottom, comprising a suitable stock, a cutter movable toward and from the axis of the tool, and standing at the beginning of work at approximately its maximum distance from said axis, and an independent shaper or pattern-cam corresponding to the decreasing diameter of the hole to be bored and coöperating with the cutter to control its movement toward the axis of the tool as the boring progresses, to properly shape the hole.

2. A tool for boring holes or recesses of decreasing diameter from top to bottom, comprising a suitable stock, a cutter movable toward and from the axis of the tool, a spring holding said cutter at approximately its maximum distance from said axis at the beginning of work, and an independent shaper or pattern cam or surface corresponding to the decreasing diameter of the hole to be bored and coöperating with the cutter to positively move it toward the axis of the tool as the boring progresses, to properly shape the hole.

3. A tool for boring holes or recesses of decreasing diameter from top to bottom, comprising a suitable stock, a cutter movable toward and from the axis of the tool, and a pattern-plate movable longitudinally of the axis of the tool and adapted to rest at its lower end upon the surface of the work, and coöperating with the cutter to control the movement of the latter toward the axis of the tool, to properly shape the hole.

4. A tool for boring holes or recesses of decreasing diameter from top to bottom, comprising a suitable stock, a cutter movable toward and from the axis of the tool, a spring pressing said cutter in one direction, and a vertically-movable pattern-plate adapted to rest at its lower end upon the surface of the work and coöperating with the cutter and spring to control the movement of the cutter relatively to the axis of the tool, to properly shape the hole.

5. A tool for boring holes or recesses of decreasing diameter from top to bottom, comprising a suitable stock, a cutter located at one side of said stock and movable toward and from the same, a spring pressing said cutter away from the stock, and a vertically-movable pattern-plate at the opposite side of the stock adapted to be moved upwardly relatively to the body of the tool as the boring progresses, and coöperating with the cutter to draw the latter toward the stock of the tool, to properly shape the hole.

6. A tool for boring holes or recesses of varying diameter from top to bottom, comprising a suitable stock, a cutter-head carried by the lower end of said stock and adapted to form the central part of the hole, an adjustable cutter movable toward and from the axis of the tool beyond the line of cut of the cutter-head, a spring pressing said cutter in one direction, and a shaper or pattern-cam corresponding to the varying diameter of the hole to be bored and independent of but coöperating with said cutter to control its movement relatively to the axis of the tool as the boring progresses, to properly shape the hole.

7. A tool for boring holes or recesses of varying diameter from top to bottom, comprising a suitable stock, a cutter-head carried by the lower end thereof and adapted to form the central part of the hole, an adjustable cutter movable toward and from the axis of the tool beyond the line of cut of the cutter-head, a spring holding said cutter at approximately its maximum distance from said axis at the beginning of work, and a shaper or pattern-cam corresponding to the varying diameter of the hole to be bored and coöperating with the cutter to move the latter toward the axis of the tool as the boring progresses, to properly shape the hole.

8. A tool for boring holes or recesses of decreasing diameter from top to bottom, comprising a suitable stock, a cutter-head carried by the lower end thereof and adapted to form the central part of the hole, an adjustable cutter movable toward and from the axis of the tool beyond the line of cut of the cutter-head, a spring pressing said cutter in one direction, and a shaper or pattern-cam coöperating with it to control its movement toward the axis of the tool as the boring progresses, to properly shape the hole.

9. A tool for boring holes or recesses of decreasing diameter from top to bottom, comprising a suitable stock, a cutter-head carried by the lower end thereof and adapted to form the central part of the hole, an adjustable cutter movable toward and from the axis of the tool beyond the line of cut of the cutter-head, a spring pressing said cutter away from the axis of the tool, and a shaper or pattern-cam coöperating with it to move it toward the axis of the tool as the boring progresses, to properly shape the hole.

10. A tool for boring holes or recesses of varying diameter from top to bottom, comprising a suitable stock, a tool-holder mounted to slide transversely of said stock and carrying a cutter, a spring pressing said tool-holder and cutter in one direction transversely of the stock, and a sliding shaper or pattern-cam movable parallel with the axis of the tool and coöperating with the tool-holder to control the movement of the cutter relatively to the axis of the tool as the boring progresses, to properly shape the hole.

11. A tool for boring holes or recesses of varying diameter from top to bottom, comprising a suitable stock, a tool-holder mounted to slide transversely of said stock and carrying a cutter, a spring pressing said cutter away from the axis of the tool, and a shaper or pattern-cam coöperating with the tool-holder to move the cutter toward the axis of the tool as the boring progresses, to properly shape the hole.

12. A tool for boring holes or recesses of varying diameter from top to bottom, comprising a suitable stock, a cutter-head carried by the lower end thereof and adapted to form the central part of the hole, a tool-holder mounted to slide transversely of the stock and carrying a cutter operating beyond the line of cut of the cutter-head, and means coöperating with the tool-holder to control the movement of the cutter relatively to the axis of the tool as the boring progresses, to properly shape the hole.

13. A tool for boring holes or recesses of varying diameter from top to bottom, comprising a suitable stock, a cutter-head carried by the lower end thereof and adapted to form the central part of the hole, a tool-holder mounted to slide transversely of the stock and carrying a cutter operating beyond the line of cut of the cutter-head, and a spring and a shaper or pattern-cam coöperating with the tool-holder to control the movement of the cutter relatively to the axis of the tool as the boring progresses.

14. In a boring-tool or cutter-bit, the combination, with a suitable stock, of a sliding tool-holder held under tension and mounted transversely within said stock, and a shaper or pattern-cam operated by the advance of the tool and controlling the transverse movement of said tool-holder, substantially as and for the purpose set forth.

15. In a boring-tool or cutter-bit, the combination, with a suitable stock and cutter-head, of a sliding tool-holder held under tension and mounted transversely within said stock, and a shaper or pattern-cam moving substantially parallel to the axis of said tool and operating to control the transverse movement of said tool-holder, substantially as and for the purpose set forth.

16. In a boring-tool or cutter-bit, the combination, with a suitable stock or cutter-head, of a sliding tool-holder mounted transversely within said stock, a spring to normally force said holder in one direction, and a sliding shaper or pattern-cam for moving said holder in an opposite direction, substantially as and for the purpose set forth.

17. In a boring-tool, the combination of the stock A, the tool-holder F mounted to slide transversely thereof, the cutter G carried by said holder, the spring J, and the pattern-plate K coöperating with the holder F, substantially as described.

18. In a boring-tool, the combination of the stock A, the tool-holder F mounted to slide transversely through an opening in the stock, the cutter G carried by said holder, the spring J, the pattern-plate K passed through an opening in the holder F and provided with a shoulder above the same, and the spring M coöperating with the plate K, substantially as described.

19. In a boring-tool, the combination of the stock A having a head B at its lower end and provided with the centering-point C and cutter D, the tool-holder F mounted to slide transversely of the stock A, the cutter G carried by said holder, the spring J, and the pattern-plate K vertically guided in the head B and coöperating with the holder F, substantially as described.

20. In a boring-tool, the combination of the stock A having a head B at its lower end provided with the centering-point C and cutter D, the tool-holder F mounted to slide transversely of the stock A, the cutter G carried by said holder, the spring J, the pattern-plate K vertically guided in the head B and passing through the holder F, and provided above said holder with a shoulder to coöperate therewith, and at its lower end with the shoe N, and the spring M acting upon the plate K, substantially as described.

In testimony whereof I affix my signature in presence of two witnesses.

THOMAS S. FERGUSON.

Witnesses:
DEXTER L. THOMAS,
GEORGE W. SUES.